United States Patent
Heo et al.

(10) Patent No.: US 10,738,740 B1
(45) Date of Patent: Aug. 11, 2020

(54) THRUST CONTROL APPARATUS HAVING INNER AND OUTER PINTLE NOZZLES CONTROLLED BY COMMON GEAR

(71) Applicant: AGENCY FOR DEFENSE DEVELOPMENT, Daejeon (KR)

(72) Inventors: Jun-Young Heo, Daejeon (KR); Jeong-Jin Kim, Daejeon (KR); Seok-Jin Oh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/751,600

(22) Filed: Jan. 24, 2020

(30) Foreign Application Priority Data

Oct. 31, 2019 (KR) .................. 10-2019-0137779

(51) Int. Cl.
*F02K 9/84* (2006.01)
*F02K 9/80* (2006.01)
*F02K 9/86* (2006.01)

(52) U.S. Cl.
CPC .................. *F02K 9/84* (2013.01); *F02K 9/80* (2013.01); *F02K 9/805* (2013.01); *F02K 9/86* (2013.01)

(58) Field of Classification Search
CPC ... F02K 9/80; F02K 9/805; F02K 9/84; F02K 9/86
See application file for complete search history.

(56) References Cited

U.S. PATENT DOCUMENTS

| 3,726,480 A | * | 4/1973 | Miltenberger | ............ F02K 9/84 239/265.19 |
| 3,871,173 A | * | 3/1975 | McKenna | .................. F02K 9/52 60/258 |
| 2006/0278286 A1 | | 12/2006 | Spakowski et al. | |

FOREIGN PATENT DOCUMENTS

| JP | 4123140 B2 | 7/2008 |
| KR | 10-1440453 B1 | 9/2014 |
| KR | 10-1640026 B1 | 7/2016 |
| KR | 10-1873186 B1 | 6/2018 |
| KR | 10-2019-0057614 A | 5/2019 |
| KR | 10-2015618 B1 | 8/2019 |

* cited by examiner

*Primary Examiner* — Todd E Manahan
*Assistant Examiner* — Kyle Robert Thomas
(74) *Attorney, Agent, or Firm* — LRK Patent Law Firm

(57) ABSTRACT

Provided is a thrust control apparatus having a plug area variable spike pintle nozzle, in which an aerospike-shaped pintle can be used in a pintle nozzle for precise thrust control. The thrust control apparatus includes a combustion chamber, a motor housing, and an outer pintle nozzle. The motor housing has a driving motor within the combustion chamber. The outer pintle nozzle is moved in a lateral direction by the driving motor.

11 Claims, 4 Drawing Sheets

THRUST CONTROL APPARATUS HAVING INNER AND OUTER PINTLE NOZZLES CONTROLLED BY COMMON GEAR

CROSS REFERENCE TO RELATED APPLICATION(S)

This application claims the benefit of Korean Patent Application No. 10-2019-0137779, filed on Oct. 31, 2019, which is hereby incorporated by reference in its entirety into this application.

BACKGROUND OF THE INVENTION

1. Technical Field

The present invention relates to a pintle nozzle and, more particularly, to a thrust control apparatus having an aerospike pintle nozzle, the thrust control apparatus being used in a propulsion engine using solid fuel and being able to control the amount of thrust.

2. Description of Related Art

In general, rockets use a fixed nozzle to generate thrust. The nozzle has the shape of an hourglass, i.e. the cross-sectional area of the nozzle decreases and increases in the longitudinal direction. In addition, for precise thrust control, a thrust control apparatus of a solid rocket propulsion engine is generally provided with a pintle located in a nozzle throat (i.e. a pinched portion of a nozzle), such that the area of the nozzle throat is adjustable.

When the area of the nozzle throat is changed using the pintle, the ratio of expansion of "nozzle outlet area/nozzle throat area" is changed. Since the nozzle has the fixed shape, the efficiency of thrust is changed depending on the backpressure varying depending on the altitude and the movement of the pintle. A variety of altitude compensating nozzles for maximizing the efficiency of thrust has been proposed. Among such altitude compensating nozzles, the research and development of aerospike nozzles has been actively undertaken.

An aerospike nozzle is not provided with a nozzle in an expansion portion, such that an aerospike acts as a nozzle. While a typical nozzle discharges combustion gas in a direction from the center to the outside, an aerospike nozzle discharges combustion gas toward the center along a spike surface. Accordingly, the spike surface has a configuration for ideal plume expansion.

However, since the spike has a sharp tip, the problem of vulnerability to heat may occur. In addition, when a pintle is used in a typical nozzle, the efficiency of thrust may be reduced in response to wide changes in the expansion ratio due to the pintle stroke. In particular, in a situation in which the pintle is closed, the ratio of expansion may be excessively increased to cause flow separation, so that vibration may occur and the efficiency of thrust may be sharply reduced due to irregular side forces.

In order to overcome such problems, research to a plug spike nozzle, from which a spike tip is removed, has been undertaken. In addition, the shape having the plug has a recirculation area, and thus, an increase in thrust may be expected.

SUMMARY OF THE INVENTION

The present invention has been made in an effort to solve the problems and an objective of the present invention is to provide a thrust control apparatus having a plug area variable spike pintle nozzle, in which an aerospike-shaped pintle can be used in a pintle nozzle for precise thrust control.

In addition, another objective of the present invention is to provide a trust control apparatus having a plug area variable spike pintle nozzle, in which the plug area of a plug spike can be mechanically controlled without an additional driving unit, so that an optimum efficiency of thrust can be obtained.

In order to achieve one or more objectives of the present invention, provided is a thrust control apparatus having a plug area variable spike pintle nozzle, in which an aerospike-shaped pintle can be used in a pintle nozzle for precise thrust control.

The thrust control apparatus may include: a combustion chamber; a motor housing having a driving motor within the combustion chamber; and an outer pintle nozzle movable in a lateral direction by the driving motor.

Propellant may be located in an inner portion of the combustion chamber.

The thrust control apparatus may further include an inner pintle nozzle disposed at a predetermined distance from the outer pintle nozzle.

The thrust control apparatus may further include a gear connected to a central shaft of the driving motor to rotate to be in engagement with the outer pintle nozzle and the inner pintle nozzle.

Different threads may be provided on outer and inner surfaces of the gear such that the outer pintle nozzle and the inner pintle nozzle have different movement speeds.

A first thread of the different threads may be provided on the outer surface of the gear, a second thread of the different threads may be provided on the inner surface of the gear, and the size of the first thread may be smaller than the size of the second thread.

A third thread may be provided on an inner surface of the outer pintle nozzle to be meshed with the first thread.

The third thread may be provided on a portion of the inner surface of the outer pintle nozzle to limit a distance to which the outer pintle nozzle is movable.

A fourth thread may be provided on an outer surface of the inner pintle nozzle to be meshed with the second thread.

The fourth thread may be provided on a portion of the outer surface of the inner pintle nozzle to limit a distance to which the inner pintle nozzle is movable.

The size of the fourth thread may be greater than the size of the third thread so that a movement speed of one of the outer pintle nozzles is different from a movement speed of one of the inner pintle nozzles.

The second thread may extend to an inner portion of the inner surface of the gear, and the first thread may only be provided on a portion of the outer surface of the gear.

The outer pintle nozzle may include an aerospike pintle nozzle.

An air gap may be provided in a space between the outer pintle nozzle and the inner pintle nozzle to provide a heat insulation effect.

According to the present invention, the aerospike-shaped pintle can be used in the pintle nozzle for precise thrust control.

In addition, according to the present invention, the plug area of a plug spike can be mechanically controlled without an additional driving unit, so that an optimum efficiency of thrust can be obtained.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
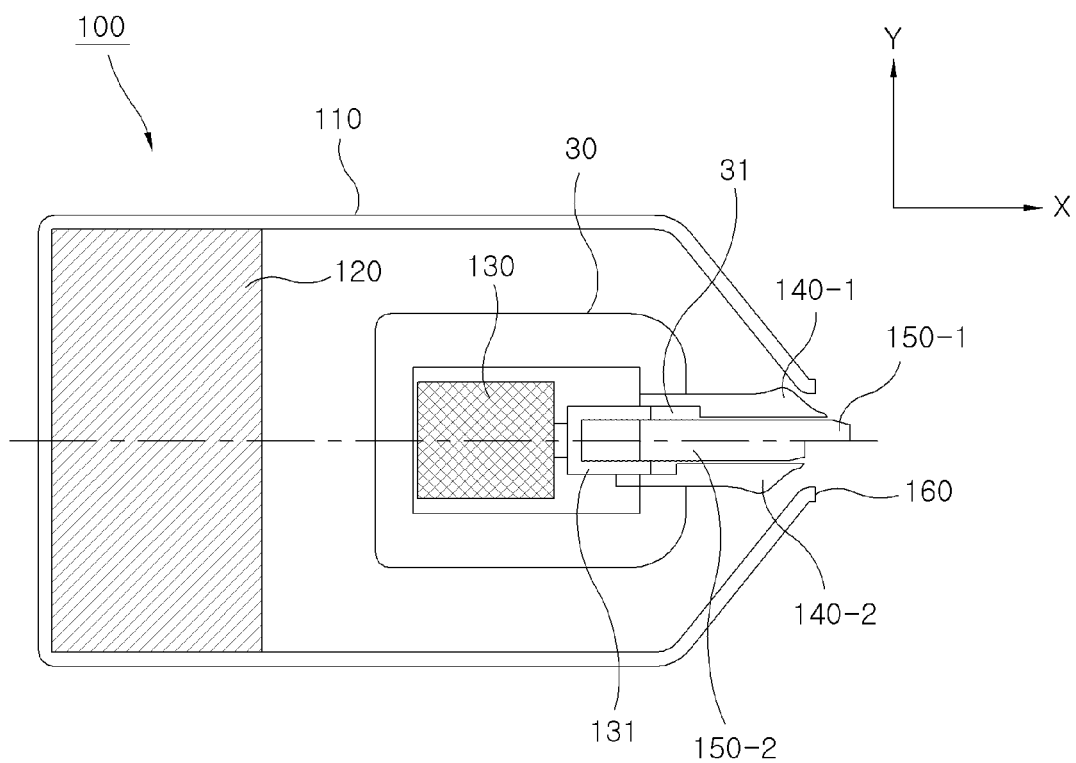
FIG. 1 is a cross-sectional view illustrating a thrust control apparatus having a spike pintle nozzle according to an embodiment of the invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

Throughout the drawings, the same reference numerals will refer to the same or like parts. Terms such as "first" and "second" may be used herein to describe a variety of elements, and the elements should not be limited by the terms. The terms are only used to distinguish one element from other elements.

For example, a first element may be referred to as a second element, and similarly, a second element may be referred to as a first element. The expression "and/or" includes any one or any combination of a plurality of related and mentioned items.

Unless otherwise defined, all terms including technical and scientific terms used herein have the same meaning as commonly understood by those having ordinary knowledge in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a spike pintle nozzle having a variable plug area according to an embodiment of the invention will be described with reference to the accompanying drawings.

FIG. 1 is a cross-sectional view illustrating a thrust control apparatus 100 having a spike pintle nozzle according to an embodiment of the invention. Referring to FIG. 1, the thrust control apparatus 100 may include a combustion chamber 110, propellant 120 located in the front portion of the interior of the combustion chamber 110, a motor housing 30 accommodating therein a driving motor 130 located in the rear portion of the interior of the combustion chamber 110, outer pintle nozzles 140-1 and 140-2 movable in lateral directions, inner pintle nozzles 150-1 and 150-2 provided inside the outer pintle nozzles 140-1 and 140-2, and the like.

A rear end 160 of the combustion chamber 110 may form a nozzle throat. The combustion chamber 110 has the shape of a hollow cylinder, with a central cross-section thereof being bottle-shaped. The combustion chamber 110 may be formed of a metal, a composite, or the like.

The propellant 120 may be located in the front portion of the interior of the combustion chamber 110. The propellant 120 may be generally solid propellant.

The motor housing 30 is located opposite to the propellant 120 within the combustion chamber 110. The driving motor 130 is disposed in the motor housing 30. The motor housing 30 is configured to be hollow, and a gear 131 is connected to the central shaft of the driving motor 130. Consequently, in response to the rotation of the gear 131, the outer pintle nozzles 140-1 and 140-2 and the inner pintle nozzles 150-1 and 150-2 are moved laterally.

In this regard, the gear 131 has a hollow configuration with a U-shaped cross-section. The motor housing 30 has an open area 31 in one end, such that the outer pintle nozzles 140-1 and 140-2 and the inner pintle nozzles 150-1 and 150-2 may move in lateral directions.

In addition, the combustion chamber rear end 160 forming a nozzle throat is provided on one end portion of the combustion chamber 110. The outer pintle nozzles 140-1 and 140-2 and the inner pintle nozzles 150-1 and 150-2 may protrude from or be inserted into the combustion chamber 110 through the combustion chamber rear end 160.

In FIG. 1, the positions of the first outer pintle nozzle 140-1 and the first inner pintle nozzle 150-1 and the positions of the second outer pintle nozzle 140-2 and the second inner pintle nozzle 150-2 are illustrated as being staggered. However, this is only for the sake of brevity, the positions of the first outer pintle nozzle 140-1 and the first inner pintle nozzle 150-1 are the same as the positions of the second outer pintle nozzle 140-2 and the second inner pintle nozzle 150-2. Specifically, the positions of the first outer pintle nozzle 140-1 and the first inner pintle nozzle 150-1 represent a situation in which the pintle is closed, and the positions of the second outer pintle nozzle 140-2 and the second inner pintle nozzle 150-2 represent a situation in which the pintle is opened.

The inner pintle nozzles 150-1 and 150-2 are fitted together, with the surfaces thereof being in contact with each other. Lubricant may be applied to the surfaces of the inner pintle nozzles to prevent abrasion due to the contact. Alternatively, the material may be selected to be a material, such as ceramics, having a low level of surface friction, such that the lubricant is not used.

Figure 2:
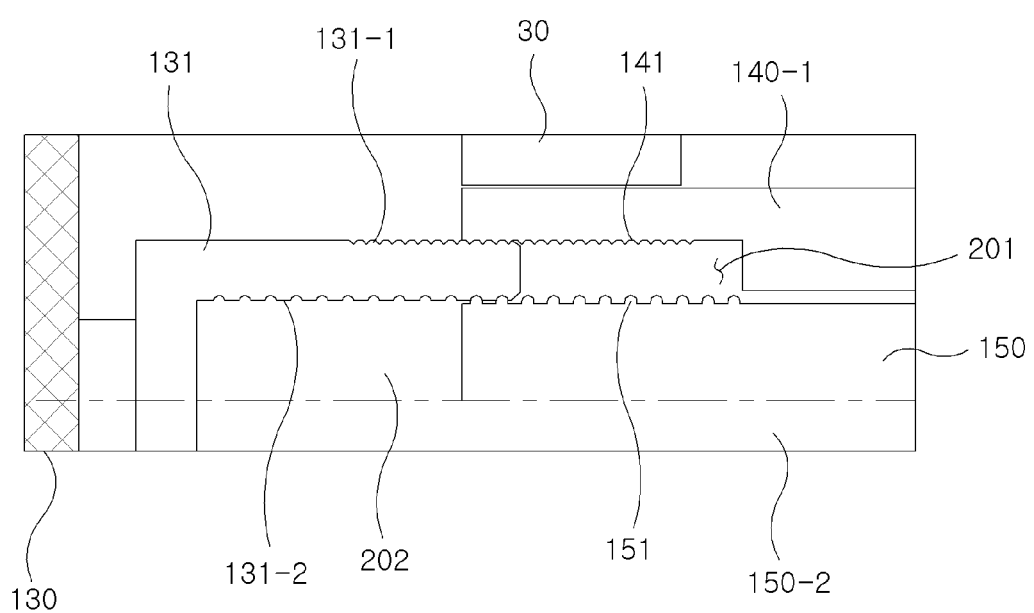
FIG. 2 is a cross-sectional view illustrating a portion of the spike pintle nozzle illustrated in FIG. 1.

FIG. 2 is a cross-sectional view illustrating a portion of the spike pintle nozzle illustrated in FIG. 1. Referring to FIG. 2, the gear 131 may have a U-shaped cross-section, with different threads 131-1 and 131-2 being provided on the inner and outer surfaces of the gear 131. Specifically, the first thread 131-1 is provided on the outer surface of the gear 131, and the second thread 131-2 is provided on the inner surface of the gear 131.

The size of the first thread 131-1 is smaller than the size of the second thread 131-2 provided on the inner surface of the gear 131. That is, there are different top lands and bottom lands. The outer pintle nozzles 140-1 and 140-2 and the inner pintle nozzles 150-1 and 150-2, provided inside the outer pintle nozzles 140-1 and 140-2, are disposed and configured to engage with the threads 131-1 and 131-2 of the gear 131.

Specifically, as illustrated in FIG. 2, a third thread 141 is provided on the inner surface of the first outer pintle nozzle 140-1 to be meshed with the first thread 131-1 of the gear 131. In addition, a fourth thread 151 is provided on the outer surface of the first inner pintle nozzle 150-1 to be meshed with the second thread 131-2 provided on the inner surface of the gear 131.

In addition, while the second thread 131-2 is provided to extend to the inner portion of the inner surface of the gear 131, the first thread 131-1 is provided on a portion of the outer surface of the gear 131.

The third thread 141 is provided on a portion of the inner surface of the first outer pintle nozzle 140-1 to limit a distance to which the first outer pintle nozzle 140-1 is movable. The fourth thread 151 is provided on a portion of the outer surface of the first inner pintle nozzle 150-1 to limit a distance to which first inner pintle nozzle 150-1 is movable.

The third thread 141 is provided on the left distal end of the first outer pintle nozzle 140-1, with a stepped portion being defined between the third thread 141 and the main portion of the first outer pintle nozzle 140-1. Thus, a first air gap 201 is provided between the distal end of the gear 131 and the stepped portion. The first air gap 201 varies in response to forward rotation or reverse rotation of the gear 131. When the gear 131 rotates clockwise, the first air gap 201 is reduced. When the gear 131 rotates counterclockwise, the first air gap 201 is expanded.

Likewise, a second air gap 202 is defined between the inner portion of the bottom of the gear 131 and the distal end of the first inner pintle nozzle 150-1. The air gap 202 varies in response to the rotation of the gear 131. The air gaps 201 and 202 are provided in the space of the outer pintle nozzles and the inner pintle nozzles to generate a heat insulation effect.

Continuing to refer to FIG. 2, the use of the multistage gear 131 may allow the outer pintle nozzles 140-1 and 140-2 and the inner pintle nozzles 150-1 and 150-2 using the single driving motor 130 to have different movement speeds. In addition, the plug area may be adjusted depending on the positions of the nozzles. The plug area refers to the cross-sectional area of the distal ends of the pintle nozzles. That is, the plug area is the cross-sectional area when viewed from the rear end.

In addition, since the inner pintle nozzles 150-1 and 150-2 and the outer pintle nozzles 140-1 and 140-2 have different threads, the plug area in a closed situation differs from the plug area in an open situation. Since the variable plug area may vary the distribution of pressure applied to the plug depending on the pintle position as described above, the efficiency of thrust may further be increased.

When the outer pintle nozzles 140-1 and 140-2 and the inner pintle nozzles 150-1 and 150-2 have different gear ratios, the plug area may vary depending on the pintle position. The plug area optimized depending on the pintle position may be applied in the stage of design.

Figure 3:
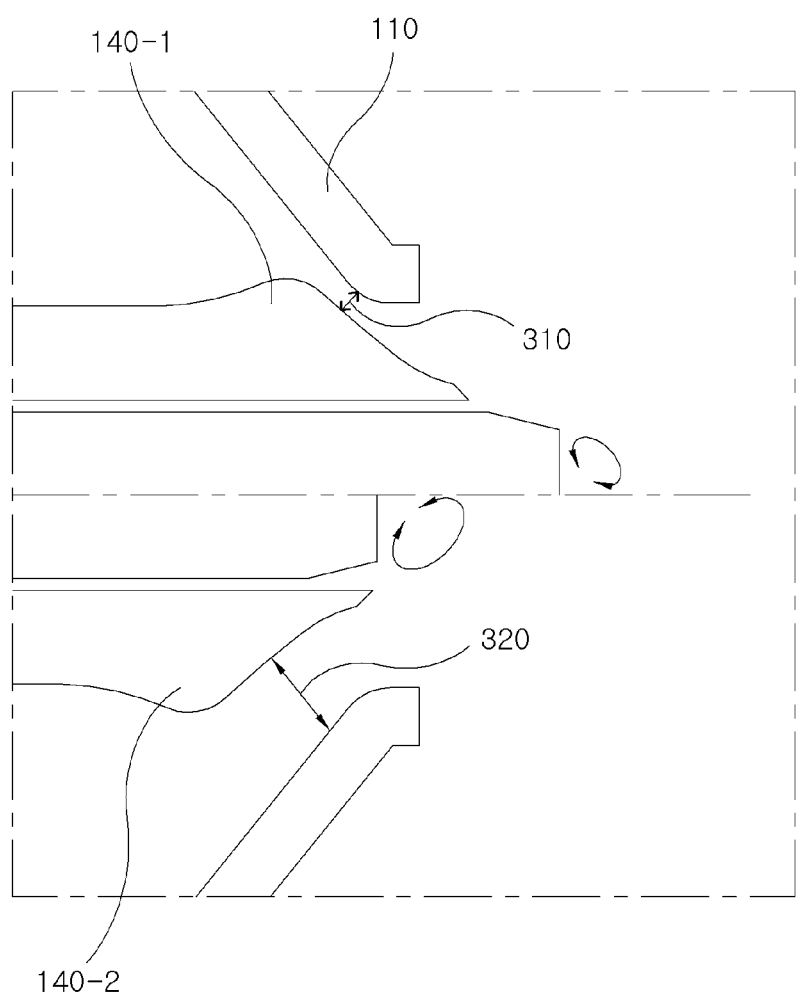
FIG. 3 is a cross-sectional view illustrating a concept in which the size of a recirculation area in the spike pintle nozzle illustrated in FIG. 1 is variable.

FIG. 3 is a cross-sectional view illustrating a concept in which the size of a recirculation area in the spike pintle nozzle illustrated in FIG. 1 is variable. Referring to FIG. 3, when the propellant 120 generates combustion gas, the combustion gas generates thrust while being discharged through the pintle nozzles 140-1 and 140-2, the inner pintle nozzles 150-1 and 150-2, and the combustion chamber rear end 160.

In this state, when the driving motor 130 is operated to move the pintle nozzles 140-1, 140-2, 150-1, and 150-2 toward the combustion chamber rear end 160, the distances 310 and 320 between the pintle nozzles 140-1, 140-2, 150-1, 150-2 and the combustion chamber rear end 160 are reduced, thereby narrowing the nozzle throat. Specifically, since the second distance 320 is greater than the first distance 310, the combustion gas discharged through the gap corresponding to the first distance 310 generates a relatively-higher level of combustion chamber pressure due to the narrow nozzle throat, thereby increasing the amount of thrust. In addition, the combustion gas discharged through the gap corresponding to the second distance 320 generates a relatively-lower level of combustion chamber pressure due to the wide nozzle throat, thereby decreasing the amount of thrust.

Figure 4:
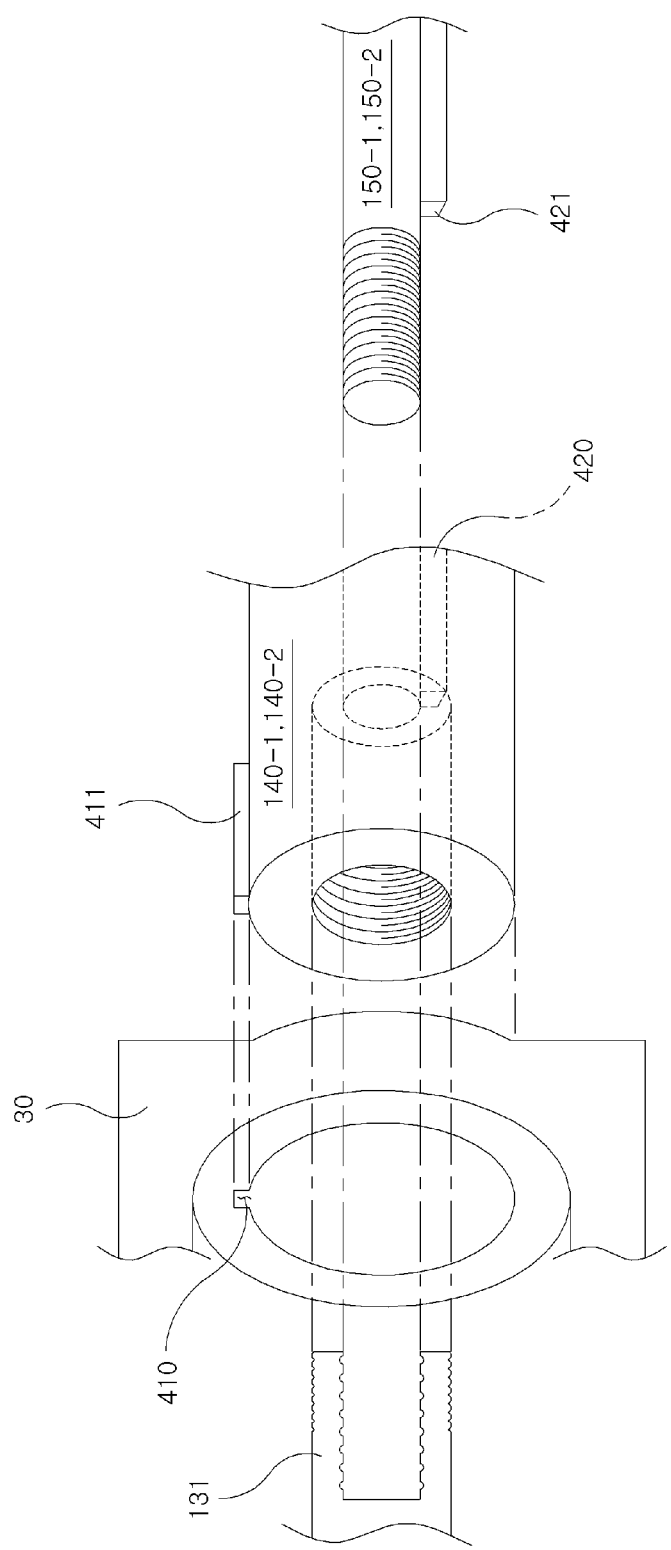
FIG. 4 is a partially exploded perspective view of FIG. 1.

FIG. 4 is a partially exploded perspective view of FIG. 1. Referring to FIG. 4, the outer pintle nozzles 140-1 and 140-2 are not rotated together with the gear 131 connected to the rotational axis of the motor 130, and are moved only in the axial direction (left and right in FIG. 1). In addition, an outer guide groove 410 may be formed on the inner circumferential surface of the motor housing 30 in the axial direction along the inner circumferential surface of the open area 31 of the motor housing 30.

Of course, an outer guide 411 sliding into the outer guide groove 410 may be formed on one outer circumferential surface of the outer pintle nozzles 140-1 and 140-2. That is, the outer guide groove 410 and the outer guide 411 are formed between the inner circumferential surface of the open portion 31 of the motor housing 30 and the outer circumferential surface of the outer pintle nozzles 140-1 and 140-2 so that the outer pintle nozzles 140-1 and 140-2 can be moved in the axial direction without rotation.

The inner pintle nozzles 150-1 and 150-2 are also rotated only in the axial direction (left and right in FIG. 1) without being rotated together with the gear 131 connected to the rotating shaft of the motor 130. The inner guide groove 420 is formed on one inner circumferential surface of the outer pintle nozzles 140-1 and 140-2. Of course, an inner guide 421 sliding into the inner guide groove 420 may be formed on one outer circumferential surface of the inner pintle nozzles 150-1 and 150-2.

That is, the inner guide groove 420 and the inner guide 421 are formed between the inner circumferential surface of the outer pintle nozzles 140-1 and 140-2 and the outer circumferential surface of the inner pintle nozzles 150-1 and 150-2 so that the inner pintle nozzles 140-1 and 140-2 can be moved in the axial direction without rotation.

As described above, the thrust is controlled by adjusting the positions of the nozzle assembly by operating the driving motor. In addition, the reduced nozzle throat increases the ratio of expansion. The application of the aerospike nozzle may provide the efficiency of thrust optimized for the variable expansion ratio. In addition, due to the application of the multistage gear 131, the plug area may be adjusted depending on the positions of the pintle nozzles. This enables the area to be adjusted so that a maximum amount of thrust can be generated.

What is claimed is:
1. A thrust control apparatus comprising:
a combustion chamber containing a solid propellant;
a motor housing having a driving motor within the combustion chamber;
an outer pintle nozzle movable in a lateral direction by the driving motor;
an inner pintle nozzle disposed at a predetermined radial distance from the outer pintle nozzle; and
a gear connected to a central shaft of the driving motor to make the driving motor in rotational engagement with the outer pintle nozzle and the inner pintle nozzle, wherein different threads are provided on outer and inner surfaces of the gear such that the outer pintle nozzle and the inner pintle nozzle have different movement speeds, and wherein the outer pintle nozzles and the inner pintle nozzles have different gear ratios such that a plug area varies depending on the positions of the outer pintle nozzles and the inner pintle nozzles.

2. The thrust control apparatus according to claim 1, wherein propellant is located in an inner portion of the combustion chamber.

3. The thrust control apparatus according to claim 1, wherein the outer pintle nozzle comprises an aerospike pintle nozzle.

4. The thrust control apparatus according to claim 1, wherein an air gap is provided in a space between the outer pintle nozzle and the inner pintle nozzle to provide a heat insulation effect.

5. The thrust control apparatus according to claim 1, wherein a first thread of the different threads is provided on the outer surface of the gear, a second thread of the different threads is provided on the inner surface of the gear, and the size of the first thread is smaller than the size of the second thread.

6. The thrust control apparatus according to claim 5, wherein the second thread extends to an inner portion of the inner surface of the gear, and the first thread is only provided on a portion of the outer surface of the gear.

7. The thrust control apparatus according to claim 5, wherein a third thread is provided on an inner surface of the outer pintle nozzle to be meshed with the first thread.

8. The thrust control apparatus according to claim 7, wherein the third thread is provided on a portion of the inner surface of the outer pintle nozzle to limit a distance to which the outer pintle nozzle is movable.

9. The thrust control apparatus according to claim 7, wherein a fourth thread is provided on an outer surface of the inner pintle nozzle to be meshed with the second thread.

10. The thrust control apparatus according to claim 9, wherein the fourth thread is provided on a portion of the outer surface of the inner pintle nozzle to limit a distance to which the inner pintle nozzle is movable.

11. The thrust control apparatus according to claim 9, wherein the size of the fourth thread is greater than the size of the third thread so that a movement speed of one of the outer pintle nozzles is different from a movement speed of one of the inner pintle nozzles.

* * * * *